E. A. NELSON.
SPRING SUSPENSION FOR MOTOR VEHICLES.
APPLICATION FILED DEC. 17, 1914.
1,254,928.
Patented Jan. 29, 1918.
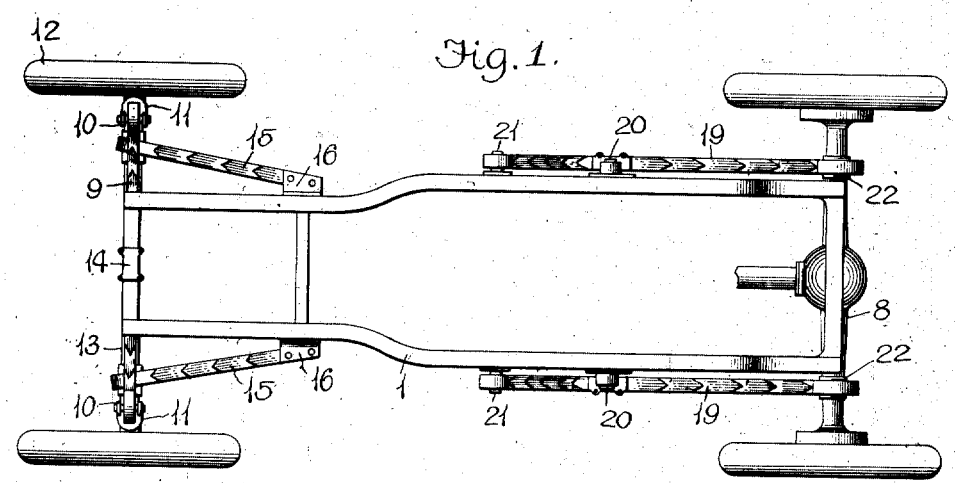
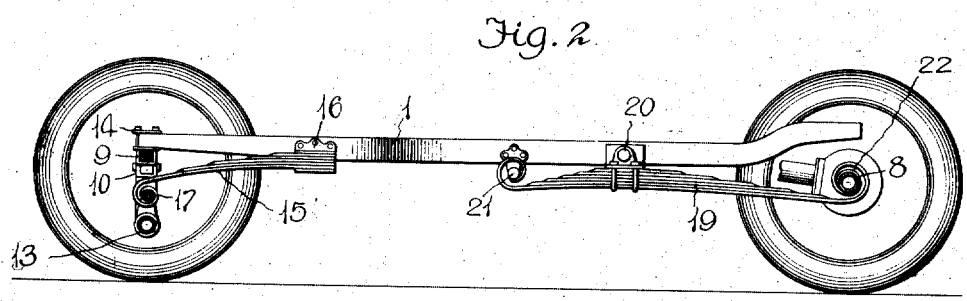
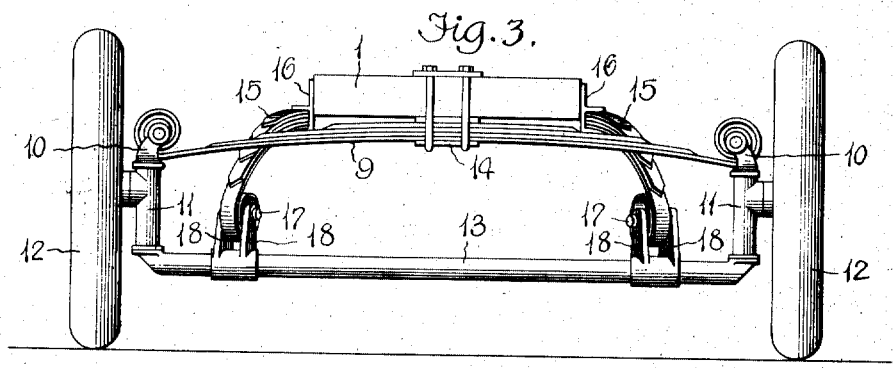
Inventor
Emil A. Nelson,
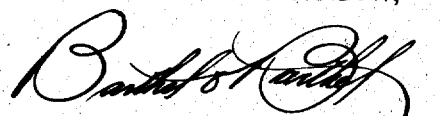

UNITED STATES PATENT OFFICE.

EMIL A. NELSON, OF RONVILLE, MICHIGAN.

SPRING SUSPENSION FOR MOTOR-VEHICLES.

1,254,928.  Specification of Letters Patent.  Patented Jan. 29, 1918.

Application filed December 17, 1914. Serial No. 877,654.

*To all whom it may concern:*

Be it known that I, EMIL A. NELSON, a citizen of the United States of America, residing at Ronville, in the county of Wayne and State of Michigan, have invented certain new and useful Improvements in Spring Suspensions for Motor-Vehicles, of which the following is a specification, reference being had therein to the accompanying drawings.

This invention relates to a spring construction particularly designed for motor vehicles, and the primary object of my invention is to provide a simple and inexpensive construction wherein a vehicle body or frame supported or suspended by a spring in accordance with this invention will be cushioned against excessive movements in both lateral and vertical directions relative to a chassis.

Another object of this invention is to provide a spring suspension embodying a spring of the cantaliver type having involute ends constructed and arranged to prevent the transmission of vibrations to the vehicle frame or body from the axle or running gear thereof and to resist rebound upon heavy flexure of the spring.

In attaining the above and other objects, the spring suspension has been constructed with a view of reducing the cost of manufacture and at the same time of retaining the features whereby road worthiness, safety, simplicity and ease of fabrication are secured. With these and other ends in view, my invention resides in the novel construction to be hereinafter specifically described and then claimed.

Reference will now be had to the drawings, wherein—

Figure 1 is a plan view of a motor vehicle chassis provided with a spring construction embodying the invention;

Fig. 2 is a sectional side elevation of the same; and

Fig. 3 a front end elevation.

In the drawings the reference numeral 1 denotes a frame or body of any suitable construction and connected to the front end thereof is a cross spring 9 of the semi-elliptic type formed with involute coils or springs at its ends, the innermost convolution of each of which is mounted to turn upon a pin or bearing member secured between parallel ears 10 on the upper ends of steering knuckles 11 carrying the front steering wheels 12. The knuckles 11 are connected in any suitable manner by the front axle 13 and the spring is rigidly secured intermediate its ends to the front end of the frame by a clip 14 or other suitable means.

The involute coils at the ends of the spring 9 each comprises a plurality of convolutions closely assembled and capable of distention and retraction. It is the winding and unwinding of the convolutions that retards various movements of the frame 1 and absorbs the vibrations of the axle, preventing their transmission to the frame or body of the vehicle and also tends to prevent rebound of the springs under extreme flexure. In a like manner lateral movement of the frame 1 in either direction is yieldingly resisted by the involute ends of the spring when said spring is arranged transversely of the frame, as shown in Fig. 3, and when the springs are arranged longitudinally of the frame, as shown in Figs. 1 and 2, end motion of said frame is yieldingly resisted by each convolution. Upon compression of the springs under load, a return movement of the frame is cushioned by the involute ends of the springs and it is also apparent that the ends serve the purpose of the common forms of shock absorbers, and obviate the necessity for spring hangers or links for connecting one or both ends of the springs to their support to permit said springs to straighten out or expand under load.

To hold the front axle in proper transverse relation to the frame, the usual radius or brace rods are dispensed with and spring members 15 substituted therefor, these members each comprising a quarter elliptic leaf spring with a convolute end or coil. The rigid end of each spring 15 is rigidly secured by means of a bracket 16 to one side of the frame 1 or to any suitable member connected thereto, and extends forwardly therefrom to a point adjacent the front axle where its convolute end is pivotally attached to the axle by means of a pivot pin or bolt 17 passing through suitable bearing ears 18 on the axle and through the sleeve 6 in the eye 5 of the coil. Preferably these springs 15 are each extended forwardly at an angle to the longitudinal side members of the frame to bring the point of attachment of each spring to the axle as near the end or knuckle thereof as practicable to better brace the axle and at the same time permit the wheels to turn with the necessary radius of movement upon the knuckles in steering the vehicle.

By substituting these springs 15 for the radius rods commonly employed to hold the axle, the necessity for universal joints is obviated due to the yield of the springs and their end coils, and said springs also serve to assist in supporting the load. The slight twisting strain which will be put upon these springs when the axle is tilted by the passing of one wheel over an obstruction, is taken by the coils which are free to yield laterally.

In Figs. 1 and 2 the rear end of the frame 1 is shown as supported upon cantaliver springs 19 each comprising a leaf spring body portion having convolute ends, the body being pivotally attached to the frame by means of a stud 20 in the usual manner and the forward convolute end, by means of a stud 21 on the frame. The rear convolute end of each spring is attached to the rear axle casing 8, preferably, by providing a sleeve 22 to turn on the casing and forming the eye of the coil. The convolute ends of the cantaliver spring thus form convenient means for yieldingly and pivotally attaching said ends to the frame and axle.

Obviously the spring embodying the invention may be embodied in other arrangements of spring suspension, and other changes in the form or construction of said spring may be made without departing from the spirit of the invention. I do not therefore limit myself to the form, construction or arrangement shown.

What I claim is:—

1. A new article of manufacture, comprising a cantaliver spring having involute ends, means for pivotally attaching said spring intermediate its ends to a member to be supported thereby, said member being so located as to provide a spring with a long and a short arm, means for connecting the involute end of the short arm of said spring to said member to be supported, and means for connecting the involute end of the long arm of said member to a supporting member.

2. The combination with a vehicle frame and running gear therefor, of a cantaliver spring having involute ends, means on the frame for pivotally connecting the spring intermediate the ends thereof to said frame at a point to provide a long arm at one end of the spring and a short arm at the opposite end, rigid means for attaching the eye of the involute end of the short arm of the spring to said frame, and rigid means for connecting the eye of the involute end of the long arm of the spring to a member of the running gear.

In testimony whereof I affix my signature in presence of two witnesses.

EMIL A. NELSON.

Witnesses:
G. E. McGrann,
L. E. Flanders.